US012639656B2

(12) United States Patent
Neumann

(10) Patent No.: US 12,639,656 B2
(45) Date of Patent: May 26, 2026

(54) SYSTEM AND METHOD FOR PRESENTING AN AMALGAMATED CARRIAGE METHOD

(71) Applicant: KPN INNOVATIONS, LLC., Lakewood, CO (US)

(72) Inventor: Kenneth Neumann, Lakewood, CO (US)

(73) Assignee: KPN INNOVATIONS, LLC, Lakewood, CO (US)

( * ) Notice: Subject to any disclaimer, the term of this patent is extended or adjusted under 35 U.S.C. 154(b) by 675 days.

(21) Appl. No.: 17/088,186

(22) Filed: Nov. 3, 2020

(65) Prior Publication Data

US 2022/0138678 A1 May 5, 2022

(51) Int. Cl.
| | |
|---|---|
| *G06Q 10/0832* | (2023.01) |
| *G06N 20/00* | (2019.01) |
| *G06Q 10/083* | (2024.01) |
| *G06Q 10/0833* | (2023.01) |
| *G06Q 50/12* | (2012.01) |
| *H04W 4/021* | (2018.01) |

(52) U.S. Cl.
CPC ......... *G06Q 10/0832* (2013.01); *G06N 20/00* (2019.01); *G06Q 10/0833* (2013.01); *G06Q 10/08355* (2013.01); *G06Q 50/12* (2013.01); *H04W 4/021* (2013.01)

(58) Field of Classification Search
None
See application file for complete search history.

(56) References Cited

U.S. PATENT DOCUMENTS

| | | | |
|---|---|---|---|
| 10,043,149 | B1 | 8/2018 | Iacono et al. |
| 10,977,751 | B1 * | 4/2021 | Bernstein ........... G06Q 10/0832 |
| 2015/0161564 | A1 * | 6/2015 | Sweeney .......... G06Q 10/08355 |
| | | | 705/338 |
| 2019/0385121 | A1 * | 12/2019 | Waliany .................... G06F 9/54 |
| 2021/0192648 | A1 * | 6/2021 | Bernstein ........... G06Q 10/0832 |

OTHER PUBLICATIONS

Zachary Steever, Dynamic courier routing for a food delivery service, Mar. 26, 2019 (Year: 2019).*

* cited by examiner

*Primary Examiner* — Ismail A Manejwala
(74) *Attorney, Agent, or Firm* — Caldwell LLC

(57) ABSTRACT

A system and method configured to gain at least a first aliment from at least a client device, generate a first carriage method as a function of the first aliment, wherein generating further comprises gaining a contemporary element relating to an at least provisioner, determining a recipe vector as a function of the first aliment, and generating a first carriage method as a function of the contemporary element, recipe vector, and a first model, identify at least a aliment exhortation as a function of the first aliment selection, first carriage method, and a conveyance model, determine a second carriage method as a function of the aliment exhortation, generate a amalgamated carriage method, wherein generating further comprises, gaining a status element relating to the first aliment from a provisioner and generating the amalgamated carriage method by amalgamating the first and second carriage method as a function of the status element, and present the amalgamated carriage method on the client device.

20 Claims, 6 Drawing Sheets

SYSTEM AND METHOD FOR PRESENTING AN AMALGAMATED CARRIAGE METHOD

FIELD OF THE INVENTION

The present invention generally relates to the field of food delivery. In particular, the present invention is directed to a system and method for presenting an amalgamated carriage method.

BACKGROUND

Individuals are often reluctant to purchase an aliment from a courier as individuals are often indecisive in selecting a specific aliment from one provisioner. After purchasing a single aliment, individuals may feel remorse in purchasing that aliment. This is complicated by the vast majority of aliment advertisements, which further confuses individuals when selecting an aliment of interest.

SUMMARY OF THE DISCLOSURE

In an aspect a system for presenting an amalgamated carriage method includes a computing device, the computing device configured to gain at least a first aliment from at least a client device, generate a first carriage method as a function of the first aliment, wherein generating further comprises gaining a contemporary element relating to an at least provisioner, determining a recipe vector as a function of the first aliment, and generating a first carriage method as a function of the contemporary element, recipe vector, and a first model, identify at least a aliment exhortation as a function of the first aliment selection, first carriage method, and a conveyance model, determine a second carriage method as a function of the aliment exhortation, generate a amalgamated carriage method, wherein generating further comprises, gaining a status element relating to the first aliment from a provisioner and generating the amalgamated carriage method by amalgamating the first and second carriage method as a function of the status element, and present the amalgamated carriage method on the client device.

In another aspect method for presenting a amalgamated carriage method includes gaining, by a computing device, at least a first aliment from at least a client device, generating, by the computing device, a first carriage method as a function of the first aliment, wherein generating further comprises gaining a contemporary element relating to an at least provisioner, determining a recipe vector as a function of the first aliment, and generating a first carriage method as a function of the contemporary element, recipe vector, and a first model, identifying, by the computing device, at least a aliment exhortation as a function of the first aliment selection, first carriage method, and a conveyance model, determining, by the computing device, a second carriage method as a function of the aliment exhortation, generating, by the computing device, a amalgamated carriage method, wherein generating further comprises, gaining a status element relating to the first aliment from a provisioner and generating the amalgamated carriage method by amalgamating the first and second carriage method as a function of the status element, and presenting, by the computing device, the amalgamated carriage method on the client device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for presenting an amalgamated carriage method on a client device. In an embodiment, presenting the amalgamated carriage method may amalgamate at least a first carriage method and at least a second carriage method. Aspects of the present disclosure can also be used to recommend a second aliment as a function of a first aliment. Exemplary embodiments illustrating aspects of the present disclosure are described below in the context of several specific examples.

Figure 1:
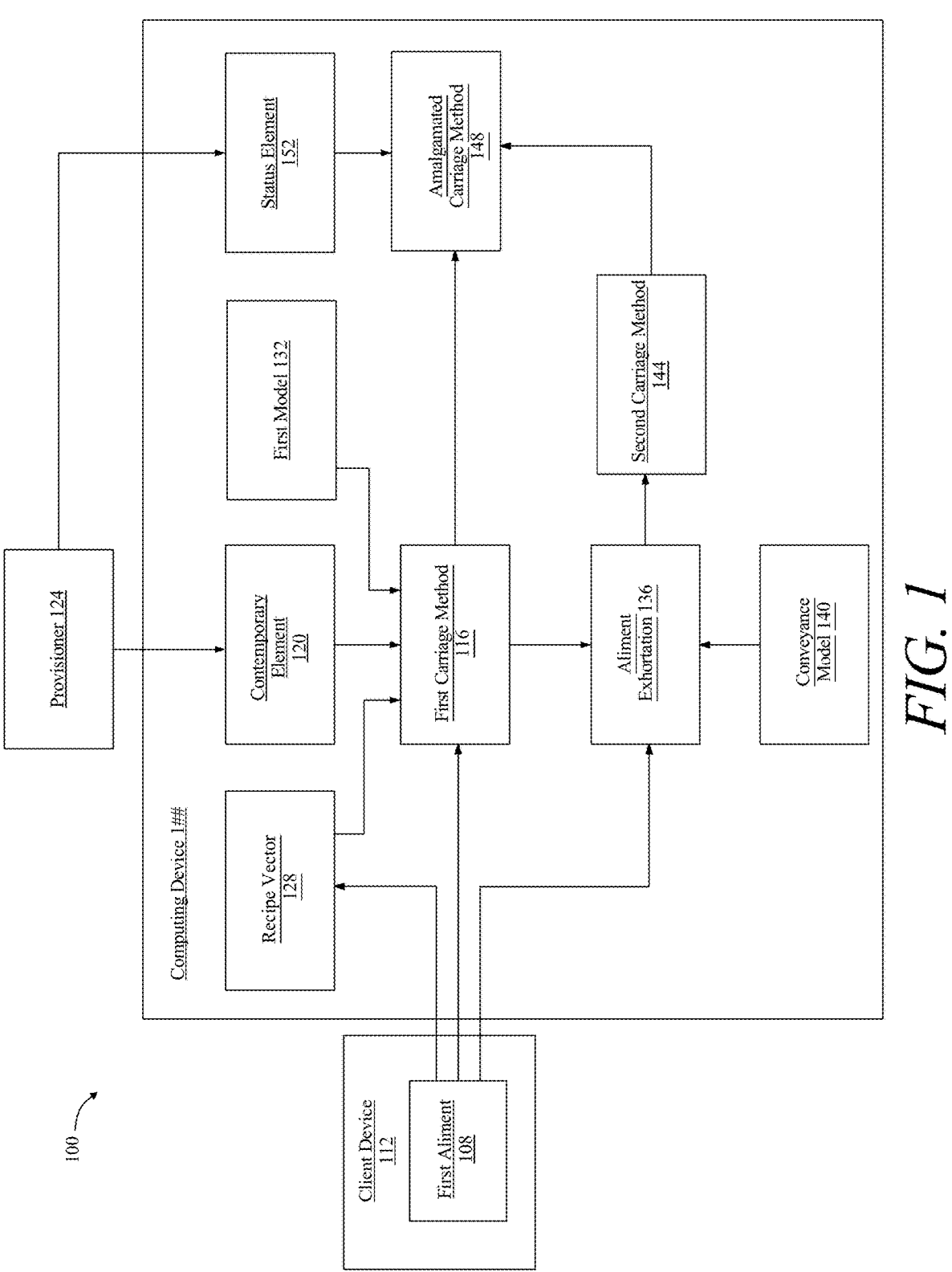
FIG. 1 is a block diagram illustrating an exemplary embodiment of system for presenting an amalgamated carriage method.

Referring now to FIG. 1, an exemplary embodiment of a system 100 for presenting an amalgamated carriage method is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

Still referring to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 is configured to gain at least a first aliment 108. As used in this disclosure a "first aliment" is an initial aliment that is selected by an individual as a preference. First aliment may include one or more edibles that at least provide a source of nourishment to an individual. As a non-limiting example a first aliment may include a fruit, such as an apple, pear, nectarine, banana, orange, tomato, and the like thereof. As a further non-limiting example a first aliment may include edibles such as steak, seafood, cookies, pie, vegetables, and the like thereof. Computing device 104 gains aliment selection 108 from at least a client device 112. As used in this disclosure "client device" is an apparatus that is operated by a user that at least allows a user to select an aliment. Client device 112 may be tethered to computing device 104 and/or may be remotely connected via one or more telecommunication devices. As a non-limiting example client device 112 may include a graphical user interface, a human-machine interface, a compositive user interface, and the like thereof. As a further non-limiting example client device 112 may include at least a mobile device, laptop, tablet, computer, desktop, telephone, smartphone, smart watch, E-reader, gaming console, netbook, personal digital assistant, phablet, pager, wearable computer, and the like thereof.

Still referring to FIG. 1, computing device 104 is configured to generate a first carriage method 116 as a function of first aliment 108. As used in this disclosure a "first carriage method" is an estimated delivery time for a first aliment that relates to a delivery route, wherein a delivery time is measured in time intervals, such as seconds, minutes, hours, days, weeks, and the like thereof. As used in this disclosure "delivery routes" are one or more specified courses and/or pathways that may be followed to at least travel to a selected location. As a non-limiting example a delivery route may identify that a first road should be followed for a distance of 0.1 miles and turn left onto a subsequent road prior to arriving at a destination. As a further non-limiting example a delivery route may identify walking to a specified location using one or more identified sidewalks, such as walking 3 blocks east followed by walking 2 blocks north to arrive at the specified location. First carriage method 116 may identify one or more delivery times as a function of one or more delivery routes. As a non-limiting example a first delivery route may be generated that would take a total of 15 minutes to travel to a specified location that is 2 miles away, wherein a second delivery route may be generated that would take 12 minutes to travel to the specified location that is 1.7 miles away.

Still referring to FIG. 1, first carriage method 116 is generated by gaining a contemporary element 120 relating to an at least provisioner 124. As used in this disclosure "contemporary element" is datum relating to the current status of the provisioner, which may include, without limitation the geolocation of the provisioner at a specific point in time. As used in this disclosure "provisioner" is an individual and/or entity that at least prepares, sells, and or provides aliments. Provisioner 124 may provide contemporary element 120 using one or more remote devices, that at least relate datum, bits, signals, notifications, and the like thereof to computing device 104. As a non-limiting example a contemporary element may include a specified location of a stationary provisioner such as a restaurant, wherein the contemporary element may identify location information such as an address. As a further non-limiting example a contemporary element may include a location of a mobile provisioner such as a mobile food truck, wherein the location of the mobile provisioner may be altered at different times of the day. Computing device 104 may gain contemporary element 120 by identifying a geolocation parameter, wherein a "position parameter" is datum associated with at least a current event surrounding the geolocation of the provisioner, wherein a current event may include weather reports, local events, construction, and the like thereof described below in reference to FIG. 3.

Still referring to FIG. 1, first carriage method 116 is generated by determining a recipe vector 128 as a function of the first aliment. As used in this disclosure "recipe vector" is a parameter describing a time interval required to prepare, transfer, and/or sell the aliment, wherein a time interval includes seconds, minutes, hours, days, weeks, and the like thereof. As a non-limiting example a recipe vector of 20 minutes may be determined to prepare a sandwich may be determined. As a further non-limiting example a recipe vector of 3 hours may be determined to prepare a sheet cake. As a further non-limiting example a recipe vector of 5 minutes may be determined to transfer and/or sell a cheeseburger. Computing device 104 may determine recipe vector 128 by gaining at least a recipe of first aliment from an aliment database. As used in this disclosure a "recipe" is a method that is utilized to at least prepare and or produce an aliment. A recipe may identify a series of steps to at least prepare an aliment. As used in this disclosure an "aliment database" is a datastore that stores a plurality of recipes of a plurality of aliments. The aliment database may be implemented, without limitation, as a relational database, a key-value retrieval database such as a NOSQL database, or any other format or structure for use as a database that a person skilled in the art would recognize as suitable upon review of the entirety of this disclosure. The aliment database may alternatively or additionally be implemented using a distributed data storage protocol and/or data structure, such as a distributed hash table or the like. The aliment database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. The aliment database may include, without limitation, recipes from cookbooks, online cookbooks, recipe cards, and the like thereof.

Still referring to FIG. 1, first carriage method is generated as a function of contemporary element 120, recipe vector 128, and a first model 132. As used in this disclosure "first model" is a machine-learning model that may be generated and/or trained by computing device 104 and/or one or more remote devices. First model 132 may generate an output of a first carriage method given data provided as first aliment inputs. First model 132 may be generated by one or more first machine-learning processes that computing device 104 and/or the remote devices may utilize. The first machine-learning processes include any supervised, unsupervised, or reinforcement machine-learning process that computing device 104 and/or one or more remotes device 140 may or may not use in the determination of the first carriage method. A first machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. The first machine-learning process may be trained as a function of a first training set.

As used in this disclosure "first training set" is a training set that correlates at least a contemporary element and at least a recipe vector. As a non-limiting example, the first training set may relate a contemporary element of a specific address of a provisioner that correlates to a recipe vector of 10 minutes to prepare the aliment. As a further non-limiting example, the first training set may relate a contemporary element of a mobile food truck to a recipe vector of 15 minutes to prepare the aliment.

Still referring to FIG. 1, computing device 104 may receive first model 132 from a remote device. The remote device may provide modifications to first model 132. For example, and without limitation, a modification may include a firmware update, a software update, a first model correction, and the like thereof. As a non-limiting example a software update may incorporate a new first model that relates a contemporary element to a modified recipe vector. As a further non-limiting example the remote device may transmit a modified first model, wherein the modified first model may relate new recipe vector to previously identified contemporary elements. Additionally or alternatively, the first model may be transmitted to the remote device, wherein the remote device may update the first training data and transmit an updated first model back to computing device 104. The updated first model may be transmitted by the remote device and may be received by computing device 104 as a software update, firmware update, or corrected first machine-learning model. Additionally or alternatively, the remote device may provide first model 132, wherein computing device 104 transmits a signal, bit, datum, or parameter to the remote device and receives the outputted generated first carriage method from the first model on the remote device.

Still referring to FIG. 1, computing device 104 is configured to identify at least a aliment exhortation 136. As used in this disclosure "aliment exhortation" is an aliment that is identified as a function of the at least a nutrition value and/or common combinations. As a non-limiting example the nutrition value of a sandwich may be two, wherein a aliment exhortation may identify a higher nutritional value aliment such as a salad to at least enhance the overall nutritional value an individual receives from consuming both aliments. As a further non-limiting example a common combination may consist of a cheeseburger that is commonly paired with fries. Aliment exhortation is identified as a function of first aliment 108, first carriage method 116, and a conveyance model 140. As used in this disclosure "conveyance model" is a machine-learning model that may be generated and/or trained by computing device 104 and/or one or more remote devices. Conveyance model 140 may generate an output of a second carriage method given data provided as delivery estimation inputs. Conveyance model 140 may be generated by one or more delivery machine-learning processes that computing device 104 and/or the remote devices may utilize. The delivery machine-learning processes include any supervised, unsupervised, or reinforcement machine-learning process that computing device 104 and/or one or more remotes device 140 may or may not use in the determination of the aliment exhortation. A delivery machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. The delivery machine-learning process may be trained as a function of a delivery training set. As used in this disclosure "delivery training set" is a training set that correlates at least a delivery estimation and at least a first carriage method. As a non-limiting example, the delivery training set may relate a delivery estimation of a secondary aliment of 30 minutes to a first carriage method of 15 minutes for a 10-mile delivery route. As a further non-limiting example, the delivery training set may relate a delivery estimation of a secondary aliment of 2 minutes to a first carriage method of 40 minutes for a 2-block delivery route. The delivery training set may be received as a function of user-entered valuations of delivery estimation and/or first carriage methods. The delivery training set may be received by one or more past iterations of the previous delivery estimations. The delivery training set may be received by one or more remote devices that at least correlate a delivery estimation and/or first carriage method to a second aliment.

Still referring to FIG. 1, computing device 104 may receive conveyance model 140 from a remote device. The remote device may provide modifications to conveyance model 140. For example, and without limitation, a modification may include a firmware update, a software update, a conveyance model correction, and the like thereof. As a non-limiting example a software update may incorporate a new conveyance model that relates a delivery estimation to a modified first carriage method. As a further non-limiting example the remote device may transmit a modified conveyance model, wherein the modified conveyance model may relate new first carriage method to a previously identified delivery estimation. Additionally or alternatively, the conveyance model may be transmitted to the remote device, wherein the remote device may update the delivery training data and transmit an updated conveyance model back to computing device 104. The updated conveyance model may be transmitted by the remote device and may be received by computing device 104 as a software update, firmware update, or corrected delivery machine-learning model. Additionally or alternatively, the remote device may provide conveyance model 140, wherein computing device 104 transmits a signal, bit, datum, or parameter to the remote device and receives the outputted aliment exhortation from the conveyance model on the remote device.

Still referring to FIG. 1, computing device 104 may generate aliment exhortation 140 by determining a threshold parameter. As used in this disclosure a "threshold parameter" is a set limit corresponding to a variable a aliment exhortation may not exceed due to the impracticality to incorporate a second aliment into one carriage figure. As a non-limiting example a threshold limit may be 30 minutes, wherein a aliment exhortation may not identify aliments that would exceed the threshold limit of 30 minutes to prepare and/or deliver. Computing device 104 may identify a distance threshold as a function of contemporary element. As used in this disclosure a "distance threshold" is a set length of space that may not be exceeded between the second aliment and the delivery location. As a non-limiting example a distance threshold may include a set length of 2 miles from the provisioner. As a further non-limiting example a distance threshold may include a set length of 200 feet from the provisioner. Computing device 104 may generate a time threshold as a function of recipe vector. As used in this disclosure a "time threshold" is a set length of time that may not be exceeded for preparing the second aliment. As a non-limiting example a time threshold may include a limit of 10 minutes for preparing a second aliment. As a further non-limiting example a time threshold may include a limit of 2 hours for preparing a second aliment.

Still referring to FIG. 1, computing device 104 determines a second carriage method 144 as a function of aliment exhortation 136. As used in this disclosure "second carriage method" is an estimated delivery time for a second aliment that at least relates to at least a delivery route, wherein a delivery time is measured in time intervals, such as seconds, minutes, hours, days, weeks, and the like thereof and a delivery route is a method that is taken to reach the target delivery location from the provisioner, as discussed in detail above. Second carriage method 144 may identify one or more delivery times as a function of one or more delivery routes, as discussed in detail above. As a non-limiting example a second carriage method may identify a time of 13 minutes from a mobile provisioner with a delivery route consisting of 10 miles to the delivery location. Computing device 104 may determine second carriage method 144 by gaining a second contemporary element relating to an at least provisioner As used in this disclosure "second contemporary element" is datum relating to the geolocation of the at least second provisioner for the second aliment at a specific point in time. As a non-limiting example a second contemporary element may include a secondary location of a stationary provisioner such as a restaurant, wherein the second contemporary element may identify the location of the second provisioner such as an address. Computing device 104 may determine a second recipe vector as a function of the aliment exhortation 136.

Further referring to FIG. 1, computing device 104 may generate second carriage method 144 as a function of the second contemporary element, second recipe vector, and a second model. As used in this disclosure a "second model" is a machine-learning model that may be generated and/or trained by computing device 104 and/or one or more remote devices. The second model may generate an output of a second carriage method given data provided as aliment exhortation inputs. The second model may be generated by one or more second machine-learning processes that computing device 104 and/or the remote devices may utilize. The second machine-learning processes include any supervised, unsupervised, or reinforcement machine-learning process that computing device 104 and/or one or more remotes device 140 may or may not use in the determination of the second carriage method. A second machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof. The second machine-learning process may be trained as a function of a second training set. As used in this disclosure "second training set" is a training set that correlates at least a second contemporary element and at least a second recipe vector. As a non-limiting example, the second training set may relate a second contemporary element of a specific address of a provisioner that correlates to a second recipe vector of 13 minutes to prepare the second aliment. As a further non-limiting example, the second training set may relate a second contemporary element of a mobile food truck to a second recipe vector of 37 minutes to prepare the second aliment.

Still referring to FIG. 1, computing device 104 may receive the second model from a remote device. The remote device may provide modifications to the second model. For example, and without limitation, a modification may include a firmware update, a software update, a second model correction, and the like thereof. As a non-limiting example a software update may incorporate a new second model that relates a second contemporary element to a modified second recipe vector. As a further non-limiting example the remote device may transmit a modified second model, wherein the modified second model may relate new second recipe vector to previously identified second contemporary elements. Additionally or alternatively, the second model may be transmitted to the remote device, wherein the remote device may update the second training data and transmit an updated second model back to computing device 104. The updated second model may be transmitted by the remote device and may be received by computing device 104 as a software update, firmware update, or corrected second machine-learning model. Additionally or alternatively, the remote device may provide the second model, wherein computing device 104 transmits a signal, bit, datum, or parameter to the remote device and receives the outputted generated second carriage method from the second model on the remote device.

Still referring to FIG. 1, computing device 104 generates an amalgamated carriage method 148. As used in this disclosure "amalgamated carriage method" is a total time and route of delivery for providing the first aliment and the second aliment to the delivery location. Amalgamated carriage method 148 is generated by gaining a status element 152. As used in this disclosure "status element" is a condition and/or position of a first aliment that is provided by provisioner 124. As a non-limiting example a status element may identify that a first aliment is currently 7 minutes from being completed, wherein the initial recipe vector identified a total time of 30 minutes to prepare. As a further non-limiting example a status element may identify that a first aliment was delayed, requiring an additional 15 minutes added to the recipe vector of 32 minutes. Amalgamated carriage method 148 is generated by amalgamating first carriage method and second carriage method as a function status element, wherein amalgamating includes an amalgamating algorithm. As used in this disclosure an "amalgamating algorithm" is an algorithm or implementation thereof on a computing device that includes a mathematical formula that at least relates a first carriage method to at least a second carriage method. An amalgamating algorithm may include addition formulas, subtraction formulas, lattice formulas, scratch formulas, and the like thereof. As a non-limiting example, an amalgamating algorithm may include receiving a first carriage method of 30 minutes to travel 22 miles, a second carriage method of 26 minutes to travel an additional 17 miles, and a status element of a first aliment being 23 minutes remaining, wherein a lattice formula may amalgamate the values to a amalgamated carriage method of 43 minutes for 40 miles to deliver both the first and second aliment.

Still referring to FIG. 1, computing device 104 may generate amalgamated carriage method 152$ by determining a reformed carriage method that at least includes the first and second carriage methods. As used in this disclosure an "reformed carriage method" is a new delivery route that at least coordinates one delivery route for both the first and second aliment. As a non-limiting example an reformed carriage method may include a first delivery route of two blocks east and three blocks south and a second delivery route of four blocks south and six blocks west to an amalgamated delivery route of two blocks east, four blocks south, and eight blocks west.

Still referring to FIG. 1, computing device 104 is configured to present amalgamated carriage method 148 on client device 112. Computing device 104 may present amalgamated carriage method 148 on a graphical user interface, LED display, tablet, computer, and the like thereof. Computing device 104 may present one or more amalgamated carriage methods as a function of one or more aliment exhortations. For example, and without limitation, one amalgamated carriage method may be presented for the amalgamation of a first carriage method relating to a sandwich and a second carriage method relating to a salad, wherein a secondary amalgamated carriage method may be presented for the amalgamation of a first carriage method relating to a burger and a second carriage method relating to a milkshake. As a further non-limiting example, one amalgamated carriage method may be presented for the amalgamation of a first carriage method relating to a soup produced by a stationary provisioner such as a restaurant and a second carriage method relating to a brownie produced by a mobile provisioner such as a mobile food truck.

Figure 2:
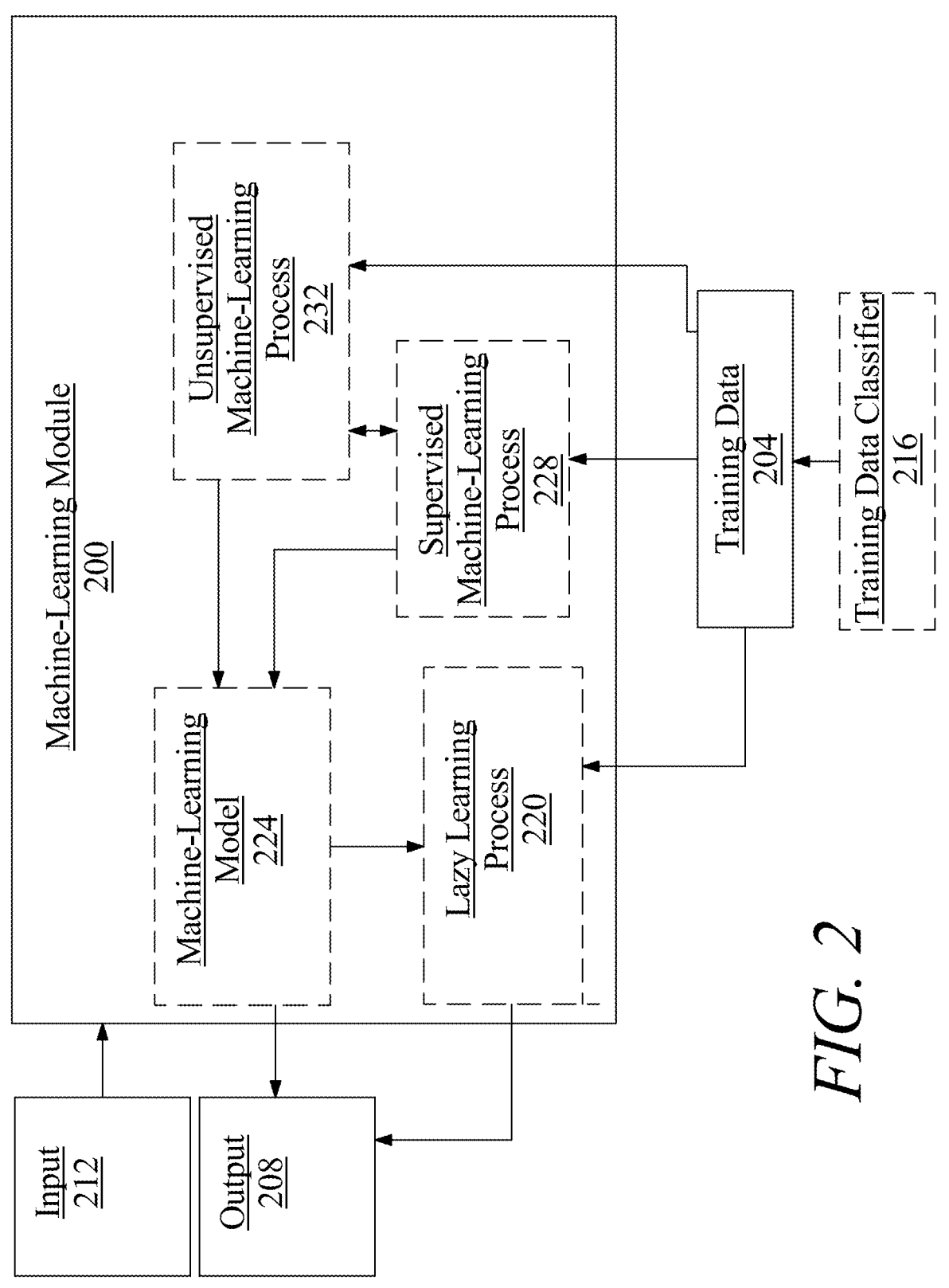
FIG. 2 is a block diagram of an exemplary embodiment of a machine-learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example inputs of nutrition elements may result in outputs of a aliment exhortation.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to categories of first aliment, such as carbohydrates, proteins, dairy and the like there of, to at least aid in identifying a aliment exhortation.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include nutrition elements as described above as inputs, aliment exhortations as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
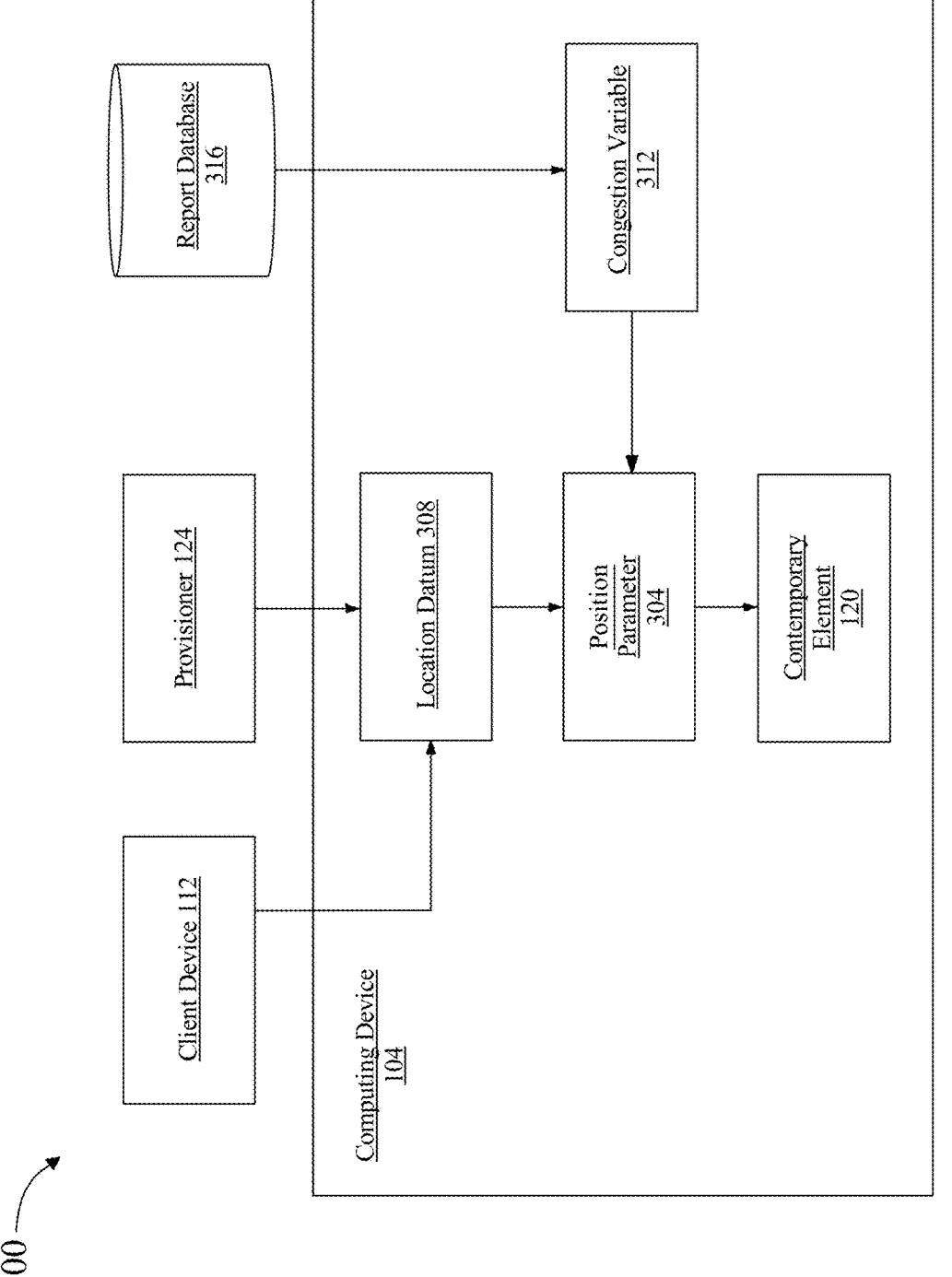
FIG. 3 is a block diagram of an exemplary embodiment of a contemporary element.

Now referring to FIG. 3, a system 300 of an exemplary embodiment of a contemporary element is illustrated. Computing system 104 may gain contemporary element 120 as a function of identifying a position parameter 304. As used in this disclosure "position parameter" is a variable that at least associates a delivery time with a current event as a function of a location, wherein a delivery time is a total amount of time required to deliver an aliment to a delivery location. As used in this disclosure a "current event" is a situation and or occurrence of that is happening in a specified location. Position parameter 304 may receive a location datum 308 from client device 112 and/or provisioner 124. As used in this disclosure "location datum" is a specific longitude and latitude of a client device and/or a provisioner. As a non-limiting example location datum 308 may include 40.7128° N, 74.0060° W for a client device. As a further non-limiting example location datum 308 may include 32.7767° N, 96.7970° W for a provisioner. Position parameter 304 may be generated as a function of a congestion variable 312. As used in this disclosure "congestion variable" is a parameter that at least determines the concentration of individuals and/or vehicles between a provisioner and a delivery location. As a non-limiting example a congestion variable may be a value of 50 for 20 cars between the provisioner and delivery location over a distance of 200 feet. As a further non-limiting example a congestion variable may be a value of 10 for 5 cars between the provisioner and delivery location over a distance of 10 miles. Congestion variable 312 may be gained as a function of a report database 316, wherein a report database is a database that provides information regarding a current event as a function of a position as discussed in detail below, in reference to FIG. 4.

Figure 4:
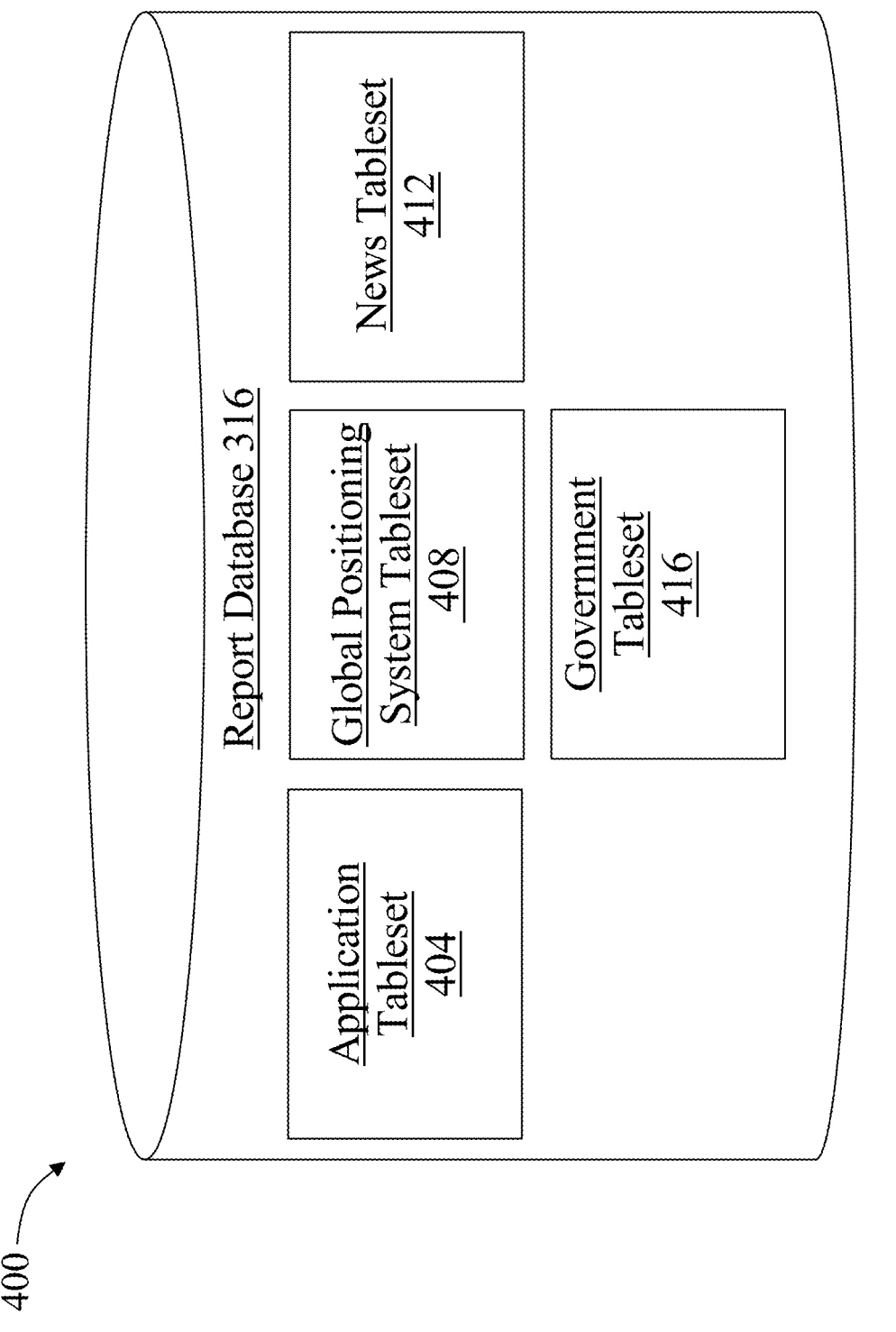
FIG. 4 is a block diagram of an exemplary embodiment of a report database according to an embodiment of the invention.

Now referring to FIG. 4, an exemplary embodiment 400 of a report database 316 according to an embodiment of the invention is illustrated. Report database 316 may be implemented, without limitation, as a relational databank, a key-value retrieval databank such as a NOSQL databank, or any other format or structure for use as a databank that a person skilled in the art would recognize as suitable upon review of the entirety of this disclosure. Report database 316 may alternatively or additionally be implemented using a distributed data storage protocol and/or data structure, such as a distributed hash table or the like. Report database 316 may include a plurality of data entries and/or records as described above. Data entries in a databank may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a databank may store, retrieve, organize, and/or reflect data and/or records as used herein, as well as categories and/or populations of data consistently with this disclosure. Report database 316 may include an application tableset 404. Application tableset 404 may indicate a congestion variable as a function of an application that is available using a smartphone and/or another wireless client device. As a non-limiting example, application tableset 404 may include Google Maps, Apple Maps, Waze, INRIX, Traffic Spotter, MapQuest, and the like thereof. Report database 316 may include a global positioning system tableset 408. Global positioning system tableset 408 may indicate a congestion variable as a function of a global position system. As a non-limiting example, global positioning system tableset 408 may Garmin, TomTom, Magellan, and the like thereof. Report database 316 may include a news tableset 412. News tableset 412 may indicate a current event that is located in or near the delivery location. As a non-limiting example, news tableset 412 may indicate a concert, sporting event, car accident, and the like thereof that may impact the congestion variable. Report database 316 may include a news tableset 412. News tableset 412 may indicate a current event that is located in or near the delivery location. As a non-limiting example, news tableset 412 may indicate a concert, sporting event, car accident, and the like thereof that may impact the congestion variable. Report database 316 may include a government tableset 416. Government tableset 416 may indicate a current traffic and/or construction location relating to the congestion variable. As a non-limiting example, government tableset 416 may include data from the Federal Highway Administration's Office, including construction locations, traffic patterns, accidents, and traffic volume trends.

Figure 5:
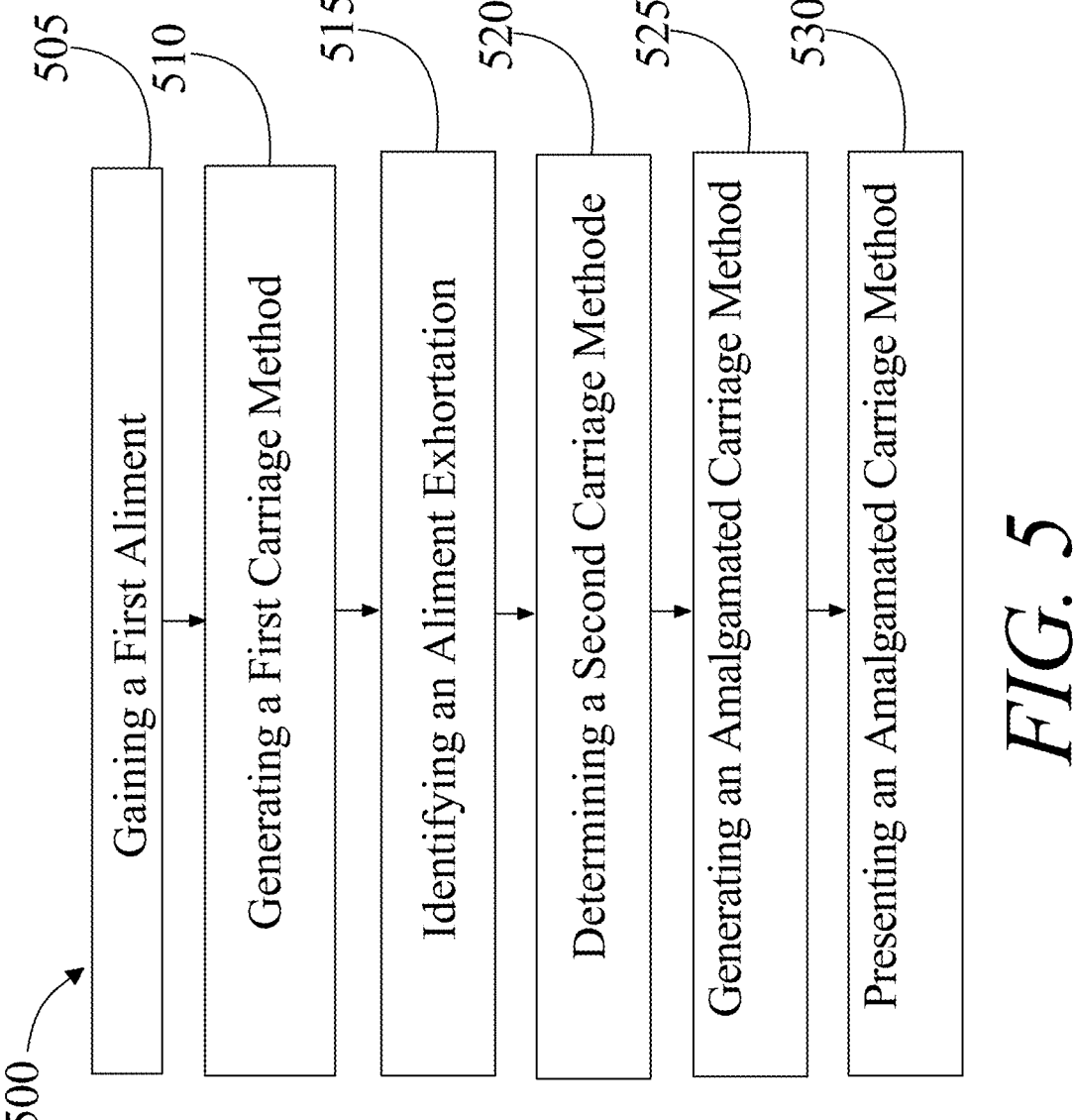
FIG. 5 is a process flow diagram illustrating an exemplary embodiment of a method of presenting an amalgamated carriage method.

Now referring to FIG. 5, an exemplary embodiment of a method 500 for presenting an amalgamated carriage method is illustrated. At step 505, a computing device 104 gains a first aliment 108 from a client device 112. First aliment 108 includes any of the first aliment 108 as described above, in reference to FIGS. 1-4. Client Device 112 includes any of the client device 112 as described above, in reference to FIGS. 1-4. As a non-limiting example computing device 104 may gain a first aliment of a cupcake from a client device of a smart phone.

With continued reference to FIG. 5, at step 510, computing device generates a first carriage method 116. First carriage method 116 includes any of the first carriage method 116 as described above, in reference to FIGS. 1-4.

For instance, and without limitation, first carriage method 116 may consist of a specific delivery route and the associated time necessary to complete the delivery route. First carriage method 116 is generated by gaining a contemporary element 120 from at least a provisioner 124. Contemporary element 120 includes any of the contemporary element 120 as described above, in reference to FIGS. 1-4. Provisioner 124 includes any of the provisioner 124 as described above, in reference to FIGS. 1-4. For instance, and without limitation, contemporary element 120 may include one or more locations of a provisioner. First carriage method 116 is generated by determining a recipe vector 128 as a function of first aliment 108. Recipe vector 128 includes any of the recipe vector 128 as described above, in reference to FIGS. 1-4. For instance, and without limitation, recipe vector 128 may include a preparation time for the first aliment. First carriage method 116 is generated as a function of a first model 132. First model 132 includes any of the first model 132 as described above, in reference to FIGS. 1-4. For instance, and without limitation, the first model may receive the first aliment as an input and output a first carriage method using a first training set, wherein a first training set relates a contemporary element to a recipe vector, as discussed in detail above.

With continued reference to FIG. 5, at step 515 computing device 104 identifies a aliment exhortation 136. Aliment exhortation 136 includes any of the aliment exhortation 136 As described above, in reference to FIGS. 1-4. For instance, a aliment exhortation may include a recommendation of a salad with a first aliment of a sandwich. Aliment exhortation 136 is identified as a function of first aliment 108, first carriage method 116, and a conveyance model 140. Conveyance model 140 includes any of the conveyance model 140 as described above, in reference to FIGS. 1-4. For instance, and without limitation, the conveyance model may receive the first carriage method as an input and output a aliment exhortation using a first training set, wherein a first training set relates a delivery estimation to a first carriage method, as discussed in detail above. Aliment exhortation 136 may be generated by determining a threshold parameter, wherein a threshold parameter includes any of the threshold parameter as described above, in reference to FIGS. 1-4. The threshold parameter may be determined by identifying a distance threshold, wherein a distance threshold includes any of the distance threshold as described above, in reference to FIGS. 1-4. The threshold parameter may be determined by generating a time threshold, wherein a time threshold includes any of the time threshold as described above, in reference to FIGS. 1-4. For instance, and without limitation, a threshold parameter may limit a aliment exhortation to second aliments that exist only within 5 miles and 15 minutes.

With continued reference to FIG. 5, at step 520 computing device 104 determines a second carriage method 144. Second carriage method 144 includes any of the second carriage method 144 as described above, in reference to FIGS. 1-4. For instance, and without limitation, second carriage method 144 may consist of a second delivery route and the associated time necessary to complete the second delivery route. Second carriage method 144 is generated by gaining a second contemporary element, wherein a second contemporary element includes any of the second contemporary element as described above, in reference to FIGS. 1-4. For instance, and without limitation, second contemporary element may include one or more locations of a second provisioner. Second carriage method 144 is generated by determining a second recipe vector as a function of a second aliment, wherein a second recipe vector includes any of the second recipe vector as described above, in reference to FIGS. 1-4. For instance, and without limitation, the second recipe vector may include a preparation time for the second aliment. Second carriage method 144 is generated as a function of a second model, wherein the second model includes any of the second model as described above, in reference to FIGS. 1-4. For instance, and without limitation, the second model may receive the aliment exhortation as an input and output a second carriage method using a second training set, wherein a first training set relates a second contemporary element to a second recipe vector, as discussed in detail above.

Still referring to FIG. 5, at step 525, computing device 104 generates an amalgamated carriage method 148. Amalgamated carriage method 148 includes any of the amalgamated carriage method 148 as described above, in reference to FIGS. 1-4. Amalgamated carriage method 148 is generated as a function of a status element 152. Status element 152 includes any of the status element 152 as described above, in reference to FIGS. 1-4. For instance, and without limitation, the status element may indicate that a first aliment is 50% prepared, limiting the remaining time available to prepare and/or deliver a second aliment. Amalgamated carriage method 148 may be generated as a function of an amalgamating algorithm, wherein an amalgamating algorithm includes any of the amalgamating algorithm as described above, in reference to FIGS. 1-4.

With continued reference to FIG. 5, at step 530, computing device 104 presents an amalgamated carriage method 148. Computing device 104 may present amalgamated carriage method 148 on a graphical user interface, LED display, tablet, computer, and the like thereof. Computing device 104 may present one or more amalgamated carriage methods as a function of one or more aliment exhortations, wherein a plurality of aliment exhortations may be identified, resulting in a plurality of amalgamated carriage methods being presented to an individual.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
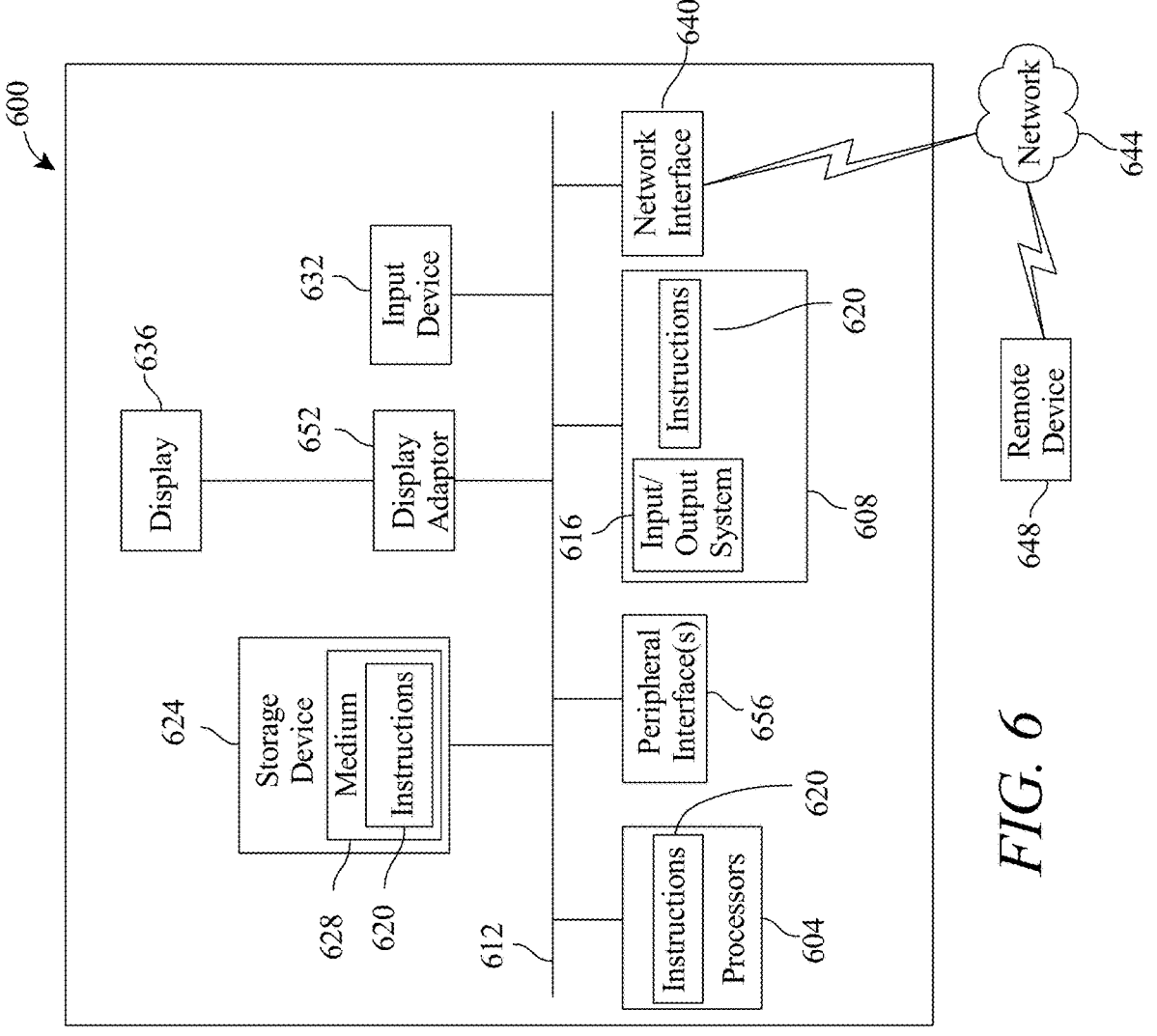
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for presenting an amalgamated carriage method, the system comprising a computing device, the computing device configured to:

gain at least a first aliment from at least a client device;

generate a first carriage method as a function of the at least a first aliment, wherein the generating further comprises:

gaining a contemporary element relating to at least a provisioner, wherein the contemporary element comprises at least a congestion variable comprising a report database comprising at least a government tableset indicating at least a construction location relating to the at least a congestion variable;

determining a recipe vector as a function of the at least a first aliment; and generating the first carriage method as a function of the contemporary element, the recipe vector, and a first machine-learning model, wherein the generating further comprises: receiving first training data;

training the first machine-learning model using the first training data, wherein the first machine-learning model correlates contemporary elements to recipe vectors; and generating the first carriage method using the trained first machine-learning model;

determine at least an aliment exhortation as a function of the at least a first aliment, the first carriage method, and a conveyance model wherein the determining further comprises:

receiving a user valuation related to the first carriage method;

receiving conveyance training data as a function of the user valuation, wherein the conveyance training data comprises conveyance model inputs generated using the trained first machine-learning model correlated to delivery estimations;

training the conveyance model using the conveyance training data;

updating the conveyance training data as a function of the first carriage method generated by the trained first machine-learning model and previous delivery estimations; and updating the conveyance model as a function of the updated conveyance training data;

determine a second carriage method as a function of the aliment exhortation, wherein the second carriage method is further determined using a second machine-learning model which comprises:

receiving second training dataset, wherein the second training dataset correlates a plurality of second contemporary element data to a plurality of second recipe vector data;

training, iteratively, the second machine-learning model using the second training data, wherein training the second machine-learning model includes retraining the second machine-learning model with feedback from previous iterations of the second machine-learning model; and determining the second carriage method using the trained second machine learning model and the at least an aliment exhortation determined by the updated conveyance model as an input;

generate an amalgamated carriage method using an amalgamating algorithm, wherein the generating further comprises:

gaining a status element relating to the at least a first aliment; and generating the amalgamated carriage method by amalgamating the first and second carriage methods as a function of the status element; and present the amalgamated carriage method on the at least a client device.

2. The system of claim 1, wherein the generating the first carriage method further comprises: gaining the first model from at least a remote device.

3. The system of claim 1, wherein the gaining the contemporary element comprises identifying a position parameter.

4. The system of claim 3, wherein the identifying the position parameter further comprises: receiving at least a client location datum of the at least a client device; receiving at least a provisioner location datum of the at least a provisioner; and determining the position parameter as a function of the at least a client location datum and the at least a provisioner location datum.

5. The system of claim 4, wherein the identifying the position parameter comprises: determining the congestion variable that relates to a concentration of individuals in a location; and identifying the position parameter as a function of the congestion variable, the at least a client location datum and the at least a provisioner location datum.

6. The system of claim 1, wherein the determining the recipe vector further comprises: gaining at least an aliment recipe of the at least a first aliment from an aliment database; and determining the recipe vector as a function of the aliment recipe.

7. The system of claim 1, wherein the determining the aliment exhortation comprises: determining a threshold parameter; and identifying the aliment exhortation as a function the threshold parameter, the at least a first aliment, the first carriage method, and the conveyance model.

8. The system of claim 7, wherein the determining the threshold parameter comprises: identifying a distance threshold as a function of the contemporary element; generating a time threshold as a function of the recipe vector; and determining a threshold parameter that at least relates to the distance threshold and the time threshold.

9. The system of claim 1, wherein the determining the second carriage method further comprises: gaining a second contemporary element relating to at least a second provisioner; determining a second recipe vector as a function of a second aliment; and generating the second carriage method as a function of the second contemporary element, the second recipe vector, and a second model.

10. The system of claim 1, wherein the generating the amalgamated carriage method comprises determining a reformed carriage method comprising an alteration of the first carriage method.

11. A method for presenting an amalgamated carriage method, the method comprising:

gaining, by a computing device, at least a first aliment from at least a client device;

generating, by the computing device, a first carriage method as a function of the at least a first aliment, wherein the generating further comprises:

gaining a contemporary element relating to at least a provisioner, wherein the contemporary element comprises at least a congestion variable comprising a report database comprising at least a government tableset indicating at least a construction location relating to the at least a congestion variable;

determining a recipe vector as a function of the at least a first aliment; and generating the first carriage method as a function of the contemporary element, the recipe vector, and a first machine-learning model, wherein the generating the first machine-learning model further comprises:

receiving first training data;

training the first machine-learning model using the first training data, wherein the first machine-learning model correlates contemporary elements to recipe vectors; and generating the first carriage method using the trained first machine-learning model;

determining, by the computing device, at least an aliment exhortation as a function of the at least a first aliment, the first carriage method, and a conveyance model, wherein the determining further comprises:

receiving a user valuation related to the first carriage method;

receiving conveyance training data as a function of the user valuation, wherein the conveyance training data comprises conveyance model inputs generated using the trained first machine-learning model correlated to delivery estimations;

training the conveyance model using the conveyance training data;

updating the conveyance training data as a function of the first carriage method generated by the trained first machine-learning model and previous delivery estimations; and updating the conveyance model as a function of the updated conveyance training data;

determining, by the computing device, a second carriage method as a function of the aliment exhortation, wherein the second carriage method is further determined using a second machine-learning model which comprises:

receiving second training dataset, wherein the second training dataset correlates a plurality of second contemporary element data to a plurality of second recipe vector data;

training, iteratively, the second machine-learning model using the second training data, wherein training the second machine-learning model includes retraining the second machine-learning model with feedback from previous iterations of the second machine-learning model; and determining the second carriage method using the trained second machine learning model and the at least an aliment exhortation determined by the updated conveyance model as an input;

generating, by the computing device, an amalgamated carriage method using an amalgamating algorithm, wherein the generating further comprises:

gaining a status element relating to the at least a first aliment; and generating the carriage method by amalgamating the first and second carriage methods as a function of the status element; and presenting, by the computing device, the amalgamated carriage method on the at least a client device.

12. The method of claim 11, wherein the generating the first carriage method further comprises: gaining the first model from at least a remote device.

13. The method of claim 11, wherein the gaining the contemporary element comprises identifying a position parameter.

14. The method of claim 13, wherein the identifying the position parameter further comprises: receiving at least a client location datum of the at least a client device; receiving at least a provisioner location datum of the at least a provisioner; and determining the position parameter as a function of the at least a client location datum and the at least a provisioner location datum.

15. The method of claim 14, wherein the identifying the position parameter comprises: determining the congestion variable that relates to a concentration of individuals in a location; and identifying the position parameter as a function of the congestion variable, the at least a client location datum and the at least a provisioner location datum.

16. The method of claim 11, wherein the determining the recipe vector further comprises: gaining at least an aliment recipe of the at least a first aliment from an aliment database; and determining the recipe vector as a function of the aliment recipe.

17. The method of claim 11, wherein the determining the aliment exhortation comprises: determining a threshold parameter; and identifying the aliment exhortation as a function the threshold parameter, the at least a first aliment, the first carriage method, and the conveyance model.

18. The method of claim 17, wherein the determining the threshold parameter comprises: identifying a distance threshold as a function of the contemporary element; generating a time threshold as a function of the recipe vector; and determining a threshold parameter that at least relates to the distance threshold and the time threshold.

19. The method of claim 11, wherein the determining the second carriage method further comprises: gaining a second contemporary element relating to at least a second provisioner; determining a second recipe vector as a function of a second aliment; and generating the second carriage method as a function of the second contemporary element, the second recipe vector, and a second model.

20. The method of claim 11, wherein the generating the amalgamated carriage method comprises determining a reformed carriage method comprising an alteration of the first carriage method.

* * * * *